United States Patent [19]

Fish

[11] 4,051,363
[45] Sept. 27, 1977

[54] SPLIT-PATH RECEIVER FOR FIBER OPTICS APPLICATION

[75] Inventor: Franklin H. Fish, Indianapolis, Ind.

[73] Assignee: The United States of America as represented by the Secretary of the Navy, Washington, D.C.

[21] Appl. No.: 670,013

[22] Filed: Mar. 24, 1976

[51] Int. Cl.² ............................................. H01S 3/02
[52] U.S. Cl. .................................. 250/199; 250/551; 330/125
[58] Field of Search ............... 250/199, 551, 552, 212, 250/262, 361, 369; 330/124, 125, 126; 307/242, 236, 262; 325/140, 141

[56] References Cited

U.S. PATENT DOCUMENTS

| 3,007,116 | 10/1961 | Gerhard | 330/125 |
| 3,878,397 | 4/1975 | Robb | 250/551 |

Primary Examiner—Robert L. Griffin
Assistant Examiner—Edward L. Coles
Attorney, Agent, or Firm—R. S. Sciascia; Paul S. Collignon

[57] ABSTRACT

A receiver for use with a photodiode in an electro-optical transmission line. First and second amplifier circuit channels are connected to an output port of a photodiode. One channel is provided with a wide-bandwidth amplifier for amplifying the high frequency portion of a signal from said output signal port and a second channel is provided with a low frequency amplifier for amplifying direct current and the low frequency portions of the signal from said output signal port. The outputs of the wide-bandwidth amplifier and the low frequency amplifier are combined to provide a composite output signal which is an amplified replica of the output of said photodiode.

2 Claims, 3 Drawing Figures

(a) INPUT CHANNEL
(b) AC CHANNEL
(c) DC CHANNEL
(d) AMPL. OUTPUT
(e) ERROR CURRENT
(f) OUTPUT SIGNAL

SPLIT-PATH RECEIVER FOR FIBER OPTICS APPLICATION

CROSS-REFERENCES TO RELATED APPLICATIONS

Patent application of Franklin H. Fish, entitled, "High Speed Fiber Optic Communication Link", Ser. No. 570,927, filed Apr. 22, 1975.

BACKGROUND OF THE INVENTION

The present invention relates to a receiver amplifier and more particularly to an optoelectronic receiver circuit for accepting a low level, high impedance output signal from a photodiode and then amplifying this signal to a voltage and power level suitable for interfacing with standard circuitry while introducing a minimum of signal distortion.

One problem in transmitting information through standard electrical cables is the undesirable effect of radiated and conducted EMI electro-magnetic interference) normally associated with these cables. Such EMI may, for example, cause spurious or other erroneous readings from equipment attached to the cable. One solution to this problem has been to convert the information to be transmitted from electrical energy to light energy, transmit the light energy signal through a light conducting cable such as, for example, a fiber optic bundle, and reconvert the light energy into electrical energy at the receiving end. Since the light conducting cable is not responsive to EMI, interference on the line is thus eliminated.

Fiber optic technology is being considered for future applications in two distinct areas of the data communication field. The first of these application areas, which is presently under intensive development, is concerned with the transmission of data over medium to long distances. Long distance data transmission utilizes low loss optical fiber, avalanche photodiode detectors with special low noise preamplifiers and bias stabilization circuits, thermoelectrically cooled laser diodes, and periodic repeater stages. Because of the potentially large commercial application for long distance optical data transmission, much privately sponsored research is directed towards this area. Medium and long distance optical communication links are also of considerable interest to the military departments.

The second area of development is concerned with the optical transmission of data over short distances of a few hundred meters or less. The advantages to be gained over the use of conventional wire cables include: high per channel data rate capability, immunity to electro-magnetic interference, lower cable weight, elimination of fire hazard due to electrical shorting, and potentially lower cost. For short length data link applications, multi-fiber bundles of medium and high loss fiber are utilized. Light emitting diodes (LED's) are employed as optical sources, and photodiodes are used for optical detection. Short distance optical data transmission is of particular interest to the military departments since this technology has been proposed for the optical wiring of aircraft where line lengths of 150 feet or less are encountered.

The technology required for the application of fiber optic data transmission systems to military equipment is in the early feasibility stage of development. At present, considerable effort is being expended towards defining and developing the components and systems needed for the implementation of fiber optics data links. Much progress is still required in all aspects of fiber optics technology before reliable, large scale applications can be made to military systems. In view of the above, a very limited amount of prior art exists in the particular area of optoelectronic receiver design directly pertaining to the invention described in this paper. This receiver amplifier configuration is optimized for use in avionics applications. The use of short lengths of medium loss fiber, LED source diodes, and PIN photodiodes is assumed.

If there is a low to medium data rate requirement, then the optoelectronic receiver can generally be designed with dc coupling. Conversely, a high data rate system requires the use of wide-bandwidth, ac coupled amplifiers. The use of ac coupling introduces two circuit problems. First, the lack of low frequency response imposes a limit on the number of "ones" or "zeros" which can be sent in a continuous string when NRZ (non return to zero), binary coding is utilized. The second problem is caused by the variation in average dc output level with data word content. In order to avoid difficulties, careful design of the one-zero threshold detection circuitry is required, in conjunction with restrictions on the data word content. Both of these problems can be significantly reduced by the use of a Manchester type code which has a logic transition in each bit interval. Another advantage of this type of coding is that the clock signal can be recovered from the data word at the receiver. The primary disadvantage is that two bit times are required for each data bit transmitted. As a result, the usable upper data rate of the system is one-half of the rate at which simple binary coded information can be sent. In summary, with an ac coupled data link system there is an interdependence between the digital coding scheme employed and the hardware implementation. The use of a dc coupled system eliminates this interdependence.

In the design of a dc coupled receiver there is a tradeoff between the required dc gain sensitivity and bandwidth. For optimum dc sensitivity the sources of dc error must be reduced to a minimum. In general, a very high level of dc performance can be achieved only by use of components and circuit configurations which inherently have low bandwidth capabilities. Conversely, wide-bandwidth systems must utilize ac coupled amplifiers which have no dc or low frequency response.

SUMMARY OF THE INVENTION

The present invention relates to a receiver for use with a photodiode and utilizes two parallel amplifier channels. A high performance dc amplifier handles the low frequency component of the signal. The high frequency portion of the signal is split off and amplified by an ac coupled, wide-bandwidth amplifier. The two amplified signals are then recombined by use of an uniquely configured active circuit. The composite amplifier exhibits excellent dc response and wide-bandwidth, and from its input and output ports appears as a single amplifier. The primary advantage of the present invention is that it combines the outstanding features of a high quality dc amplifier with the performance of an ac coupled, wide-bandwidth amplifier.

It is therefore a general object of the present invention to provide an amplifier circuit for accepting a low level, high impedance output signal from a photodiode and amplifying this signal with a minimum of distortion.

Other objects, advantages and novel features of the present invention will become apparent from the following detailed description of the invention when considered in conjunction with the accompanying drawings.

DESCRIPTION OF THE PREFERRED EMBODIMENTS

Figure 1:
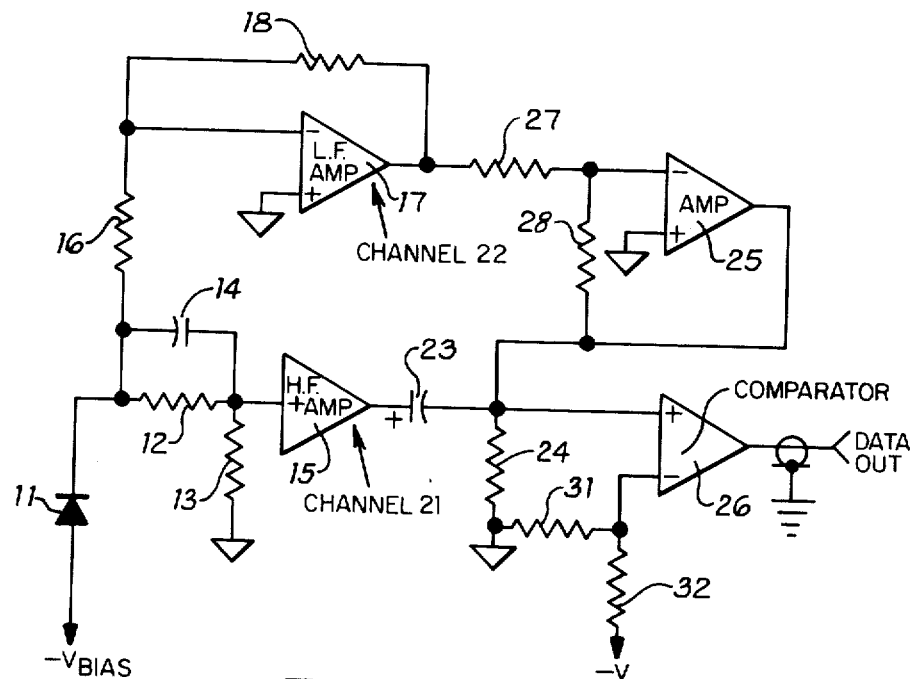
FIG. 1 is a schematic diagram of one embodiment of the present invention.

Referring now to the drawings, FIG. 1 shows and embodiment of the present invention which is configured for analog signals. A photodiode 11 appears as a current source shunted by device junction capacitance. The network, comprised of resistors 12 and 13, and capacitor 14, is the terminating load for photodiode 11. Under all operating conditions, the entire diode signal current flows through resistor 13. A high frequency amplifier 15 is provided and the signal voltage at the input of the high frequency amplifier 15 is, therefore, of constant amplitude up to the upper frequency limit set by the shunt capacitance of the photodiode. This shunt capacitance is comprised of diode capacitance, amplifier input capacitance, the capacitance of resistors 13 and 16, and the stray parasitic wiring capacitance. It is assumed that capacitor 14 acts as perfect short circuit to the higher frequencies. Bandwidth optimization consistent with maximum high frequency network gain occurs when the input network response is made equal to the high frequency amplifier bandwidth. For dc and low frequency signals, capacitor 14 is an open circuit, so photodiode current must flow through the series combination of resistors 12 and 13. The voltage generated across resistors 12 and 13 is the input signal for the low frequency amplifier 17. Resistor 12 is made at least one order of magnitude larger than resistor 13, so the low frequency signal voltage is larger than the high frequency signal voltage by approximately the ratio of the resistance of resistor 12 to the resistance of resistor 13. Since the low frequency channel has minimal bandwidth requirements, the resistance of resistor 12 can be made relatively large. The input signal to amplifier 17 is thus of sufficient magnitude that amplifier dc input error sources contribute negligibly to the overall dc error.

The upper roll-off frequency for the low bandpass channel 22 is controlled by resistor 12–capacitor 14 time constant. For proper overall circuit operation, the frequency responses of the two channels must overlap by a minimum of one decade. The value of capacitor 14 and the low limit of wide-bandwidth amplifier 15 are chosen to provide this requirement.

The gain of amplifier 17 is determined by the ratio of the resistance of resistor 18 to the resistance of resistor 16. The value of resistor 16 is made much larger than the value of resistor 12 to minimize loading of the input network. As the output from channels 21 and 22 are combined, it is necessary that the overall mid-band gains of the two channels be matched.

The output terminal of wide-bandwidth amplifier 15 is capacitively coupled by capacitor 23 to load resistor 24. The capacitor 23–resistor 24 time constant determines the low frequency cutoff of the wide-bandwidth channel 21. For proper operation, the output impedance of amplifier 15 must be very low so that the output circuit of amplifier 15 appears to be a nearly ideal voltage source to the load. It can thus be seen that a high frequency signal from photodiode 11 is amplified by wide-bandwidth amplifier 15 and appears across resistor 24. The low frequency channel 22 does not respond to the high frequency portion of the signal from photodiode 11, however, it does restore the dc baseline of the signal, as hereinafter described.

The low-frequency channel 22 responds to dc and low-frequency signals from photodiode 11. Amplifier 17 feeds the signal to amplifier 25, which has a specially configured current source output stage. At low frequency the circuit functions as a voltage amplifier with gain determined by the ratio of the resistance of resistor 28 to the resistance of resistor 27. The input signal is further amplified and appears across load resistor 24. The high-frequency channel does not respond to low frequency or dc signals, so it is in effect non-operational for this mode of operation.

The high frequency signal appears across resistor 24 and is fed to error amplifier 25 through resistor 28 and is compared to the low frequency reference signal. The difference signal which is necessary to correct the dc and low frequency errors in the signal across resistor 24 is developed by amplifier 25. Analog comparator 26 is used to amplify the signal across resistor 24 to standard emitter coupled logic (ECL) levels. The "one-zero" detection level is set by resistors 31 and 32.

Figure 2:
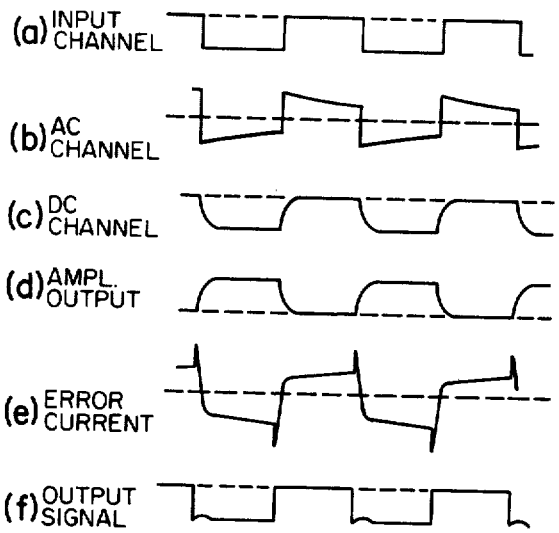
FIG. 2 is a diagram showing circuit waveforms for the embodiment shown in FIG. 1.

Referring now to FIG. 2 of the drawings, FIG. 2(a) represents a typical digital input signal developed by the photodiode 11 current flowing through the input network. The most negative voltage is the logic "one" level due to a light pulse impinging on photodiode 11. The absence of a light signal ideally results in zero signal level. In a normal system application, an order-of-magnitude variation in signal level can be expected so the circuitry must be designed to function properly throughout this range. If it as assumed that the low frequency amplifier channel 22 is disconnected, then the signal response of the receiver will be as shown by (b) of FIG. 2. This signal represents the voltage waveform across resistor 24 due to high frequency channel 21 response. As expected, channel 21 transmits the very fast rise and fall times of the input signal. Pulse top sag is also present because of the absence of low frequency response. The baseline of the signal varies with the average dc level of the waveform. The errors in transmission are therefore loss of dc reference level and pulse top tilt.

Similarly, if the ac channel 21 is disconnected, then the receiver response is as shown in (c) of FIG. 2. Due to the absence of high frequency response, the fast rise and fall times are not present, however, the dc level and pulse top fidelity are transmitted correctly.

At this point, it is evident that if the signals transmitted by the two channels could be combined in the proper manner, then a composite signal could be produced which is a near exact replica of the input signal. The function of amplifier 25 is to provide dc and low frequency response, and to generate the required dc and low frequency error correction signals required to restore signal fidelity at the high and transitional frequencies. Referring to FIG. 1, the amplified low frequency signal appears at the output of amplifier 17 as shown in trace (d) of FIG. 2. This signal serves as the low frequency reference for error amplifier 25.

Assuming, for purposes of explanation, that immediately upon circuit turn-on the high frequency signal appears across resistor 24 (trace (b) of FIG. 2), this signal is fed to error amplifier 25 via resistor 28 and compared to the low frequency reference signal. The difference signal which is necessary to correct the dc and low frequency errors in the signal across resistor 24 is developed by amplifier 25 as illustrated by trace (e) of FIG. 2. The level of the error correction current pulse is seen to gradually increase in order to compensate for pulse top tilt. The offset dc level of the error correction current shows that a steady dc current is required to maintain the output signal baseline. Trace (f) of FIG. 2 shows the corrected output voltage waveform. A slight perturbation in the signal is noted at the point where the error correction circuit assumes control.

To complete the circuit description, analog comparator 26 is used to amplify the signal across resistor 24 to standard emitter coupled logic (ECL) levels. The "one-zero" detection level is set by resistors 31 and 32. This level must be adjusted to reliably detect the minimum predicted signal. Stronger signals provide an additional level of input overdrive. Since comparator 26 is a very high-speed device, the rise and fall times of the detected signal are enhanced.

Figure 3:
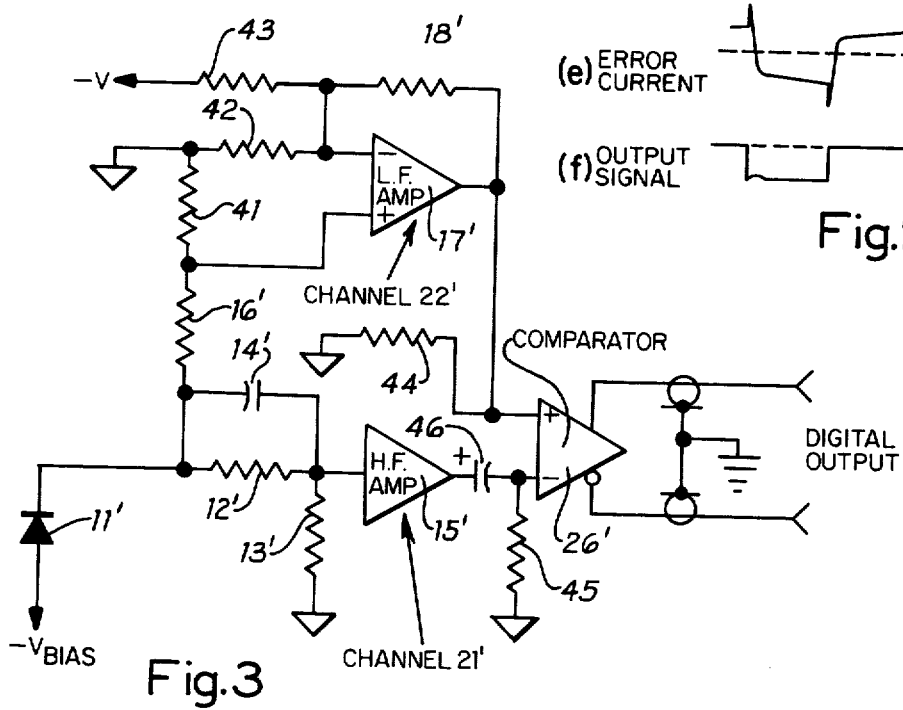
FIG. 3 is a schematic diagram of another embodiment of the present invention.

Referring now to FIG. 3 of the drawings, there is shown an embodiment of the invention for processing digital signals. As in the case of the analog receiver, the low frequency and high frequency components of the input signal from photodiode 11' are split apart and amplified through separate channels 22' and 21'. The output of the high frequency channel 21' is capacitively coupled through capacitor 46 to one input of analog comparator 26'. The positive input of comparator 26' is held at a slightly positive reference level by the signal set by resistor 43. The presence of an input pulse causes the output of amplifier 15 to swing positive and exceed the threshold of comparator 26' resulting in a digital "true" signal out of comparator 26'. Similarly, the low frequency signal is amplified without inversion by amplifier 17'. The output of amplifier 17' swings negative in response to an input "light" signal. The positive terminal of comparator 26' is therefore driven negative past the zero voltage reference level set by resistor 45, causing the comparator to again output a logic "true" signal. In the transitional frequency region, both inputs of comparator 26' are driven differentially in a manner to reinforce the desired signal response. It is seen that the reconstructed composite signal is purely digital and that all analog information has been lost.

The embodiment shown in FIG. 3 of the drawings has the advantage of being simpler to implement than the analog version shown in FIG. 1 of the drawings. Accordingly, the embodiment shown in FIG. 3 of the drawings is preferred in applications which require the transmission of digital information only, which include most fiber optics receiver applications.

Obviously many modifications and variations of the present invention are possible in the light of the above teachings. It is therefore to be understood that within the scope of the appended claims, the invention may be practiced otherwise than as specifically described.

I claim:

1. In an electro-optical transmission line, a receiver for converting light signals to electrical signals comprising,
    a photodiode for receiving light inputs and having an output signal port for providing electrical signals having responses from direct current to a high frequency cut-off,
    a first amplifier circuit channel connected to said output signal port of said photodiode comprised of a wide-bandwidth amplifier for amplifying the high frequency portion of a signal from said output signal port and providing an output,
    a second amplifier circuit channel connected to the output signal port of said photodiode comprised of a low frequency amplifier for amplifying direct current and the low frequency portions of said electrical signals and providing an output,
    a load resistor capacitively coupled to the output of said wide-bandwidth amplifier, and
    an error amplifier coupled with said load resistor and said output of said low frequency amplifier for comparing the high frequency signal with the low frequency signal and providing a feedback signal for correcting direct current and low frequency errors in the output of said wide-bandwidth amplifier.

2. In an electro-optical transmission line, a receiver for converting light signals to electrical signals as set forth in claim 1 having an analog comparator for amplifying said corrected output of said wide-bandwidth amplifier.

* * * * *